Figure 4:
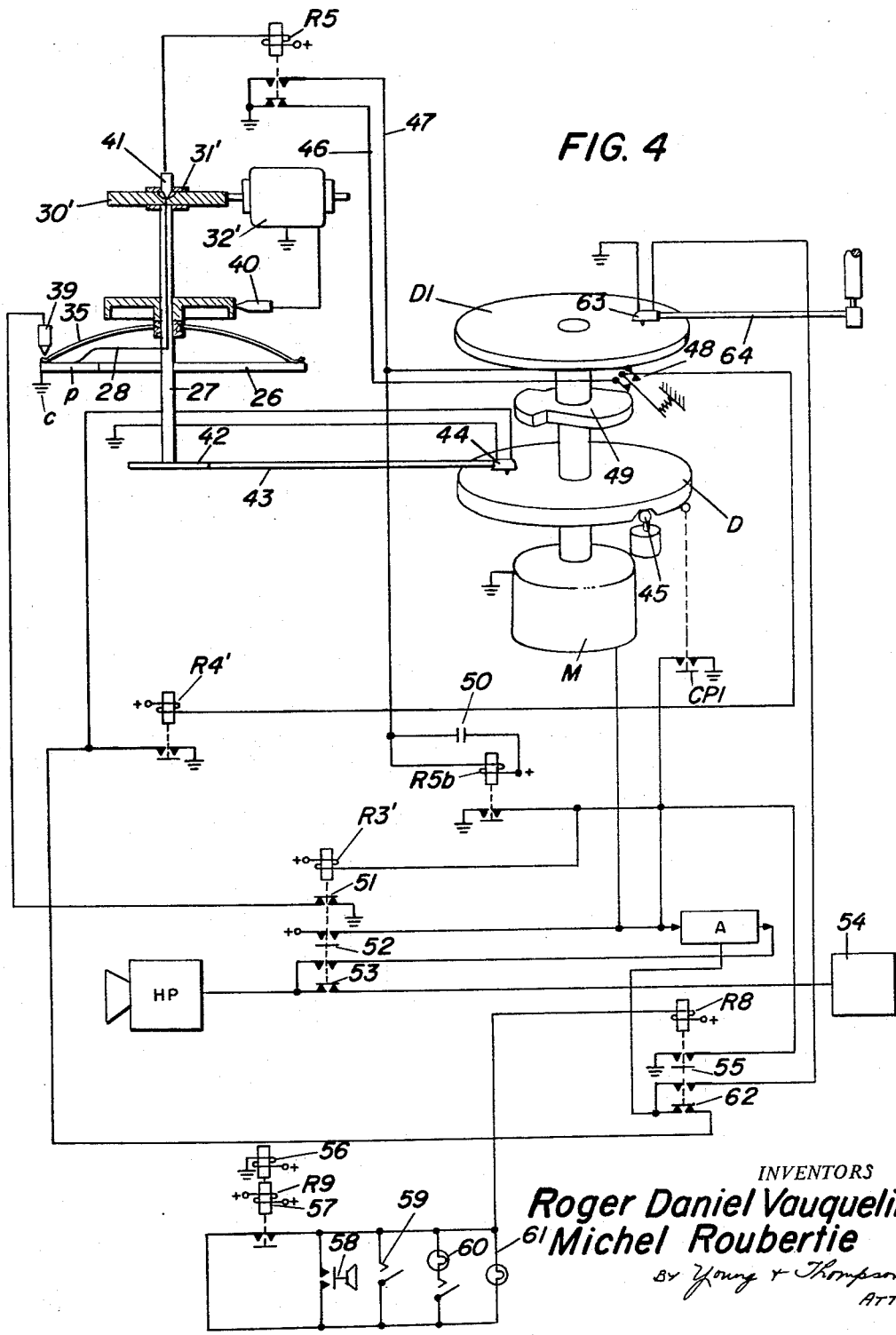

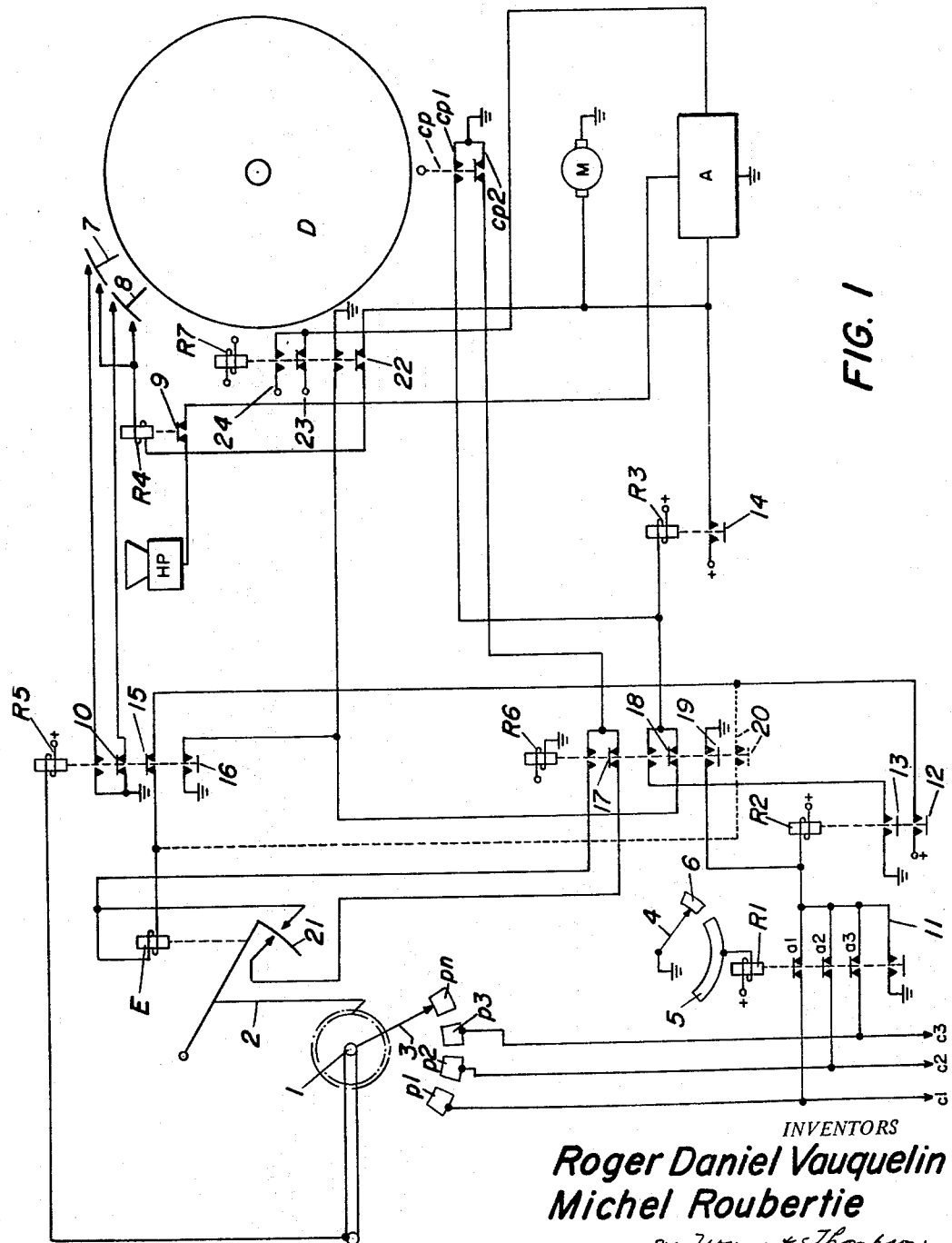

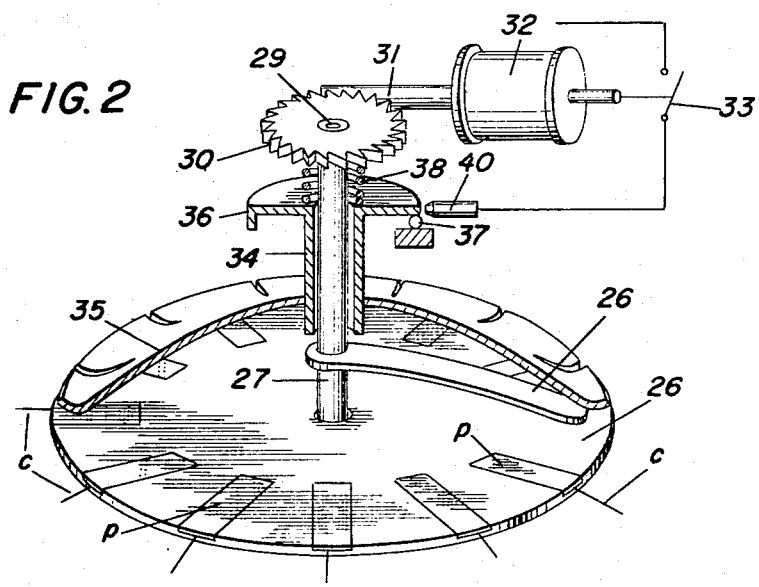
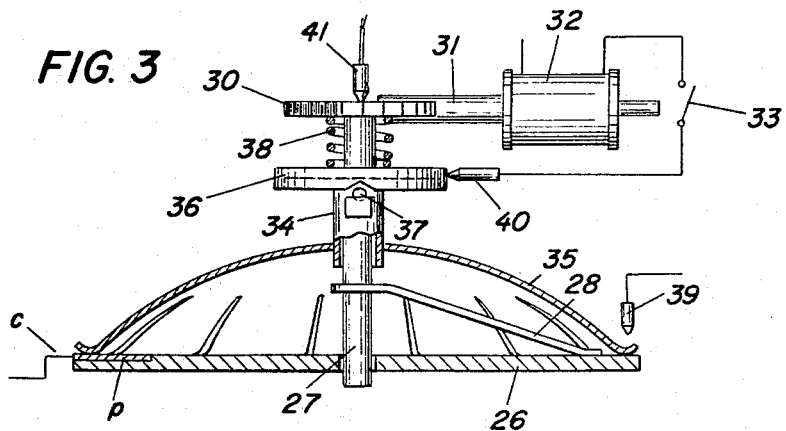
INVENTORS
*Roger Daniel Vauquelin*
*Michel Roubertie*

Sept. 27, 1966   R. D. VAUQUELIN ETAL   3,275,756
CONTROL SYSTEM INCORPORATING A SERIES OF ELECTRIC CIRCUITS AND
PROVIDING THE READING ALOUD OF AN INFORMATION CARRYING RECORD
Filed March 26, 1962   3 Sheets-Sheet 3

INVENTORS
Roger Daniel Vauquelin
Michel Roubertie
By Young & Thompson
ATTYS.

3,275,756
Patented Sept. 27, 1966

3,275,756
CONTROL SYSTEM INCORPORATING A SERIES OF ELECTRIC CIRCUITS AND PROVIDING THE READING ALOUD OF AN INFORMATION CARRYING RECORD
Roger Daniel Vauquelin, 15 rue d'Armenonville, Neuilly-sur-Seine, France, and Michel Roubertie, 6 bis Boulevard de Gaulle, Sarcelles, Seine, France
Filed Mar. 26, 1962, Ser. No. 182,596
6 Claims. (Cl. 179—100.1)

Our invention has for its object an arrangement for controlling a plurality of electric circuits, and chiefly an arrangement ensuring an audible reading of a record. It has more particularly for its object to provide a simple arrangement with a view to checking the connected condition of a large number of circuits.

The arrangement according to our invention includes a number of electric control circuits, an apparatus for reading pre-established records corresponding to different situations detected by the connected condition of said circuits, means which upon closing of one of said circuits, disconnect controlled circuits, so as to scan the disconnected circuits and an arrangement subjecting the relative position of the reading member of the reading apparatus and of the record thereon to the position of the arm of the changeover means, said changeover means controlling the reading made on the reading apparatus in accordance with the electric condition of the contact-piece with which its arm cooperates.

In a first embodiment, the arrangement disconnecting the controlled circuits is constituted by a relay controlling a number of armatures. According to a second embodiment, the arrangement disconnecting the controlled circuits is a contact-making armature cooperating with a system of contact-pieces in the different circuits and which is raised off said contact-pieces upon starting of the changeover switching system.

According to a preferred embodiment of the first type of apparatus, our improved arrangement includes a plurality of controlling contact-pieces connected on the one hand, in parallel through the agency of the inoperative armatures of a disconnecting relay with a circuit feeding a second general control relay, and on the other hand, with the contact-pieces of the scanning change-over switching means, which switching means include two scanning arms cooperating respectively with a system of independent contact-pieces and with a second contact system constituted by a continuous conductive strip carrying at one end an insulated stud. In this case, the disconnecting relay being fed through the agency of the continuous conductive strip of the second contact system of the scanning switching means, the scanning arm cooperating with the first contact system is inserted in the circuit feeding a selecting relay controlling the feeding of the means driving the changeover switching means, so as to switch off said feed and to hold fast said switching means in operative relationship with the cooperating contact-piece when the latter is fed, which selective relay controls also the circuits which are to be closed upon closing of a primary control circuit, so as to ensure that the reading member of the reading apparatus actually reads the record section corresponding to the condition for which said contact-piece is fed.

According to a preferred modification of this second embodiment of our invention, there are provided a plurality of contact-pieces connected with a corresponding number of uniformly distributed contact-pieces angularly spaced with a further gap which is open at the periphery of a disc, a contact-member cooperating with this contact-piece system, a spindle carrying a contact arm adapted to cooperate in succession with said contact-pieces and rotated by driving means, a member raising the contact element of the system of contact-pieces except when the contact arm registers with the open gap, a relay controlling the feeding of the means driving the contact arm so as to switch the latter off, when said arm cooperates with a fed contact-piece, means feeding the driving means for the contact arm, passing through the contact member and the fed contact-piece and relays controlling the energization or deenergization of all or part of the reading apparatus so that when the contact arm lies on a fed contact-piece, it is possible to ensure on the record on the reading apparatus, the reading, through the reading member of the latter, of the record section corresponding to the condition producing a feeding of the last-mentioned contact-piece.

The control means for the audible reading according to our invention include, according to a further feature, a second reading apparatus in which the position of the reading member is controlled by the speed of the vehicle carrying the arrangement, the reading being controlled by hand or automatically. In the arrangement wherein the position of the reading member is controlled by speed, there is provided, according to a further feature of our invention, an automatic reading upon breaking of the contact circuit of the driving engine through the agency of a biased relay of which the winding is inserted between the positive brush of the dynamo machine and the feeding of the primary of the ignition winding on the downstream side of the contact key. The biasing may be ensured by a permanent magnet or by a winding fed by the battery of the vehicle. When the contact key is removed so as to stop the driving engine, the current is reversed in the relay winding during a time sufficient for operation of the latter.

Numerous other features of our invention will appear from the description of two embodiments of our improved arrangement, reference being made to the accompanying drawings wherein:

FIG. 1 is a wiring diagram of a first embodiment,
FIG. 2 is a perspective view partly sectioned, of a modification of selective means for detecting failures,
FIG. 3 is an axial sectional view of said selective means,
FIG. 4 is a wiring diagram of a further embodiment incorporating the failure detecting means, according to FIGS. 2 and 3.

In the accompanying drawings, only three control contact-pieces $c1$, $c2$ and $c3$ have been illustrated, but the arrangement is applicable to any number of contact-pieces such as pressure-controlled, temperature-controlled, lever-controlled, or position-controlled contact-pieces. These contact-pieces are connected on the one hand in parallel through the armatures $a_1$, $a_2$, $a_3$ which are normally inoperative and are connected by the disconnecting relay R1 with a further relay R2 and on the one hand with the contact-pieces $p1$, $p2$, $p3$ forming a first set of contact-pieces of a switching device, which I will term hereinafter, a "rotactor." The latter includes a spindle 1 driven into stepwise rotation by the armature 2 of an electro-magnet E, which armature acts through a catch on a ratchet wheel provided with a pawl, which parts are well-known per se and are not illustrated. The spindle 1 carries an arm 3 cooperating with the contact-pieces of the first contact system $p1$ to $p3$, associated with an auxiliary contact-piece $pn$ at one end of said series, and a further arm 4 cooperating with a second contact system formed by a continuous conductive blade and an insulated stud 6 registering with the contact-piece $pn$ of the first series of conductive parts. The arms 3 and 4 are connected each with a stationary terminal. The spindle 1 carries furthermore a cam which is not illustrated or the like arrangement controlling mechanically the shifting of the pick up arm cooperating with the record D on the turntable of the reading means.

The turntable nf the reading means is subjected to a movement which brings it at the beginning of its revolution into engagement with the pick up arm, and urges it away from the latter at the end of said revolution. Said shifting serves for controlling a contact-maker $Cp$ associated with the turntable and which may be shifted from an open position $Cp1$ into a closed position $Cp2$ upon stoppage or reversely, it is brought from its closed position $Cp1$ into its open position $Cp2$ during the rotation of the turntable. The record-carrying turntable is driven by a motor M and it carries furthermore cams closing the contact-pieces 7 and 8; of the latter, the contact-piece 7 is closed during the execution of the second third of the rotation of the turntable while the contact-piece 8 is closed while the turntable and the record thereon execute the last third of their rotation. Said contact-pieces 7 and 8 are inserted in parallel in the circuit of a relay R4 which opens, through movement of its armature, a switch 9 in the circuit feeding a loud speaker HP through the agency of an amplifier A. Said contact-pieces 7 and 8 are fed selectively according to the position given to the armature 10 of a relay R5 which is fed by the stationary terminal of the arm 3 of the changeover switching means.

The relay R1 is connected between the terminal of the conductive strip 5 on the switching means of which the arm 4 is grounded and the positive terminal of the feeding means. Said relay R1 controls in addition to the armatures $a_1$, $a_2$, $a_3$, an armature 11 which closes upon opening of the contact-pieces $c1$, $c2$, $c3$, so as to ensure the feeding of R2 through the grounding of a terminal of said relay of which the other terminal is fed by the positive terminal of the feeding means. It is therefore apparent that when the arm 4 of the changeover switching means engages the conductive strip 5, R1 attracts its armature $a_1$ to $a_3$ and 11 so as to disconnect the circuits connected with the contact-pieces $c1$ to $c3$ and to feed the relay R2.

The relay R2 controls two armatures 12 and 13 which close their cooperating circuits upon energization of R2, the first armature 12 closing a switch which is inserted in the circuit of the electro-magnet E, while the other armature 13 closes a switch inserted in the circuit of a further relay R3. The latter controls, through its armature 14, the feeding of the motor M and of the amplifier A.

The relay R5 controls a second armature 15 which is inserted in series with the armature 12, so as to switch off, when said relay is energized, the circuit feeding the electro-magnet E, while a third armature 16 controlled by the relay R5, closes the cooperating contact-pieces when said relay R5 is fed; the part played by last-mentioned armature 16 will be disclosed hereinafter.

The arrangement described is designed so as to execute a controlled reading aloud of a record section such as the giving out of an indication of "danger" or of "normal operation," or else an automatic reading indicating thereby failure through the reading of the recorded word "danger." The changeover between the two manners of reading is ensured by a relay R6 having two operative positions.

The position of the relay R6 corresponding to the energization of said relay closes a circuit in which the circuit of the electro-magnet E is closed through the armatures 12 of the relay R2 and 15 of the relay R5, said circuit being thus closed across the armature 17 of the selecting relay R6 and the contact-piece $Cp2$ of the contact-maker $Cp$. The circuit of the relay R3 established through the armature 13 of the relay R2 is closed through the armature 18 of R6 so that the relay R2 is fed through the armature 19 of R6.

The inoperative position of the relay R6 closes the following circuits: the circuit of the relay R3 is closed by the armature 16 of the relay R5, when the latter is energized, and by the inoperative armature 18 of the relay R6 whereas the electro-magnet E is energized, through the contact-piece 21 which opens as soon as the armature E is attracted, and through the armature 17 of the inoperative relay R6.

The relay R6 may include optionally a further armature 20 which, upon energization of said relay, short-circuits the armature 15 of the relay R5 the operation of said armature 20 being disclosed with further detail hereinafter.

Lastly when the apparatus is to ensure the reading of speeds, it is provided with a second pick-up arm cooperating with the record D or with a further record, the position of said pick-up arm being defined by a speed measuring instrument of a known type. The above-described circuitry is then associated with a further relay R7 of which the armature 22 switches off the circuit of the relay R4 and feeds the relay R3 through the agency of the armature 17 of the inoperative relay R6 so as to change over the output of the amplifier A, from the failure detecting pick-up 23, onto the speed indicating pick-up arm 24 through the armature 25.

The operation of the arrangement disclosed is as follows:

Assuming standstill conditions, the arm 3 of the rotator engages the contact-piece $pn$ of the first contact system while the arm 4 engages the contact-piece 6 of the second contact system, the relay R1 is switched off, and the contact-pieces $a_1$ to $a_3$ are closed, while the switch provided on the armature 11 is open. The relays R2 to R5 are thus deenergized.

It will be assumed that R6 is energized in a manner such that the arrangement operates only upon detection of a failure, this corresponding to the energized position of the relay R6. When such a defect or failure arises and is detected by the closing of one of the contact-pieces $c1$ to $c3$, R2 is energized and attracts its armatures so as to close through 12, 15 and 17 the circuit of the electro-magnet E which attracts its armature, $Cp2$ being closed since the whole arrangement is at a standstill. Consequently the rotator is shifted by one step and brings the arm 3 onto the contact-piece $p1$ and the arm 4 onto the conductive strip 5 and, simultaneously, the armature 13 of R2 energizes the relay R3 which closes the circuit feeding the motor M and the amplifier A. The arm 4 of the change over means being then in contact with the conductive strip 5, the relay R1 is energized and disconnects the controlled circuits passing through the armatures $a_1$ and $a_3$ and starting from the contact-pieces $c1$ to $c3$; at the same time, it closes the circuit of R2 through the armature 11. The relay R2 remains energized and the record carrying turntable having now started, the switch is opened at $Cp2$ and the reading of the record begins. The pick-up arm connected with the amplifier through the wire 23 is positioned by a cam (not shown) fitted on the spindle 1 of the rotator, over a groove of the record which gives out the nature of the control ensured by the circuit passing through the contact-piece $c1$. If an actual defect is detected in the circuit passing through $c1$, the contact-piece $p1$ is fed, and the relay R5 is consequently energized and switches off through its contact-piece 15, the circuit feeding the electro-magnet E while it connects simultaneously through the armature 10, the contact-piece 7 with ground. As a consequence of such a connection, the relay R4 is fed through the contact-piece 7 during the second third of a revolution of the record and after the nature of the control executed has been given out, the loud-speaker remains silent. During the next third of a revolution of said record, the relay R4 is deenergized and the apparatus reads an indication such as "Danger." At the end of the revolution $Cp2$ closes, but the contact provided at 15 under the control of the relay R5 is open, and consequently the electro-magnet E is no longer fed and the change over means do not operate any further. The reading of the nature of the control performed and of the indication as to "Danger" continues until the circuit passing through the contact-piece $c1$ is broken, after correction of the defect thus detected. The short-circuit of the armature 15 through the armature 20 controlled by the relay R6, provides in contradistinction for a continuation of the reading without stopping for an abnormal control operation.

If, in controdistinction, the circuit of the contact-piece c1 is not energized, the relay R5 is not energized and the reading is performed during the second third of a revolution which corresponds to the indication "Normal." In contradistinction, the word "Danger" or the like indication is not read, and the contact-piece 8 closes the circuit feeding the relay 4. In such a case also, the closing of Cp2 at the end of the revolution closes the circuit feeding the electro-magnet E which makes the rotator progress by one step and the cycle begins over again to check the successive individual control circuits, until a further defect is detected.

At the end of the scanning, the arm 4 of the rotator switches off the circuit feeding R1 which in its turn, switches off the circuits feeding the relays R2 and R3 so that the arrangement returns into its starting position.

The operation for the inoperative position of the relay R6 is as follows: the contact being closed at Cp2, the record-carrying turntable being at a standstill, the contact at 15 controlled by the relay R5 is closed. If a circuit passing through c1, c2 or c3 is closed, R2 closes and the electro-magnet E is fed through the armature 12 whereby the rotator progresses by one step. The relay R1 which is then energized disconnects the control circuits and feeds the relay R2. The energized electro-magnet E having switched off the contact at 21, the armature returns to its starting position and closes the last-mentioned contact 21 again so as to produce a succession of pulses and steps until the arm 3 of the rotator meets the contact-piece p associated with the operative contact-piece c since, at such a moment, the relay R5 is fed and switches off through the armature 15, the circuit feeding the electro-magnet E while, through its armature 16, it feeds the relay R3 which starts the reading operation.

In order that the reading may stop in all cases only at the end of the revolution of the record, the relay R3 is fed by the contact at Cp1 which is closed by the turntable during its rotation.

Upon energization or deenergization of the relay R6 during the reading, the record cannot be scratched by a shifting of the pick-up arm controlled by the spindle 1 of the rotator, since the electro-magnet E can be fed only during the closing at Cp2. When the arrangement is being read with the relay in its energized position, and assuming the energization is then switched off, this cuts off the feeding of R3 through the contact provided at 13 by the relay R2, but R3 remains fed through Cp1 until the end of the revolution of the turntable. When Cp2 is closed, the rotator steps around until the arm 4 has been returned onto the contact-piece 6 unless the arm 3 is subjected to the action of a defect transmitted through one of the intermediate contact-pieces p. If the relay R6 is not energized, while the apparatus is in a position corresponding to the reading of a defect and said relay R6 is then energized, the indication of a defect continues being read until the end of the revolution after which, according to whether there is a short-circuit through 20 or otherwise, the record is read so as to provide either the indication as to normal operation, or to danger, or else the nature of the defect is given out until disappearance of the latter.

When it is desired to read speeds of progression, the switch controlling the energization of the relay R7 is closed, which allows changing over the feeding of the amplifier A from the wire 23 connected with the pick up of any possible defect onto the wire 24 connected with the pick up of the indication of speeds while the relay R4 is deenergized and the relay R3 is energized. The arrangement starts and reads out the speed corresponding to the position given to the pick up arm by the speedometer until the contact-piece feeding the relay R7 is opened. In order to prevent any stoppage of the arrangement outside its normal position, it is possible to feed the relay R3 through the contact-piece controlled by the turntable in its position Cp1, or else, it is possible to ensure the self-feeding of the relay R7 by means of a circuit passing through last-mentioned contact at Cp1.

The defect detecting means illustrated in FIG. 2 includes an insulating disc 26 carrying any suitable number of contact-pieces p extending over its upper surface, each contact-piece being associated with a terminal. The contact-pieces p are uniformly distributed around the periphery of the disc except for a location which carries no contact-piece or which carries an idle contact-piece. Said record is revolvably carried by a spindle 27 insulatingly carrying a contact arm 28. Said contact arm is connected with a contact-piece 29 on the terminal surface of the spindle with which said arm is rigid. The spindle is rotated by a ratchet wheel 30 cooperating with a catch 31 controlled by an electro-magnet 32 so that said ratchet wheel may rotate at each impulse received by the electro-magnet through an angle equal to the angular spacing between two successive contact-pieces p. In order to obtain the desired beating of the electro-magnet 32, the latter opens a switch 33 inserted in the circuit feeding it. A locking pawl which is not illustrated prevents any return movement of the ratchet wheel.

Over the spindle 27 is also fitted a hollow insulating sleeve 34 that rotates with said spindle but is free to slide longitudinally on the latter. Said sleeve 34 carries a bell-shaped contact member 35, of which the edge is cut so as to form a plurality of elastic tongues, for cooperation with the system of contact-pieces p and it is furthermore rigid with a cam plate 36 cooperating with a ball 37 at an unvarying level whereby the bell-shaped member may be raised above the contact-pieces p except at the moment when the contact arm 28 faces the location on the disc which carries no operative contact-piece. The bell-shaped member 35 is urged into contact with the contact-pieces p while the cam plate 36 is urged into contacting relationship with the ball 37 by a spring 38.

In its raised position, the bell-shaped member cooperates with a brush 39 and it is electrically connected with the cam plate 36 which, in its raised and lowered positions, forms a contact ring for a further brush 40 while a collecting brush 41 cooperates with the contact-piece 29.

In the above-described mechanism, as shown in FIG. 4, it is possible to replace the beating electro-magnet 32 by an electric motor 32' driving the spindle 27 through gears 30'-31'; again the bell-shaped member 35 and the cam plate 36 may be held fast against rotation, the ball 37 being then carried by a radial arm rigid with the spindle 27.

The operation of this arrangement is in all cases the same, to wit: for the lowered position of the bell-shaped member 35, current is fed into the brush 40 as soon as one of the contact-pieces p is fed. The bell-shaped member 35 being raised, it establishes a contact between the brushes 39 and 40 and lastly the arm 28 provides for contact with the brush 41 as soon as it faces an energized contact-piece p.

In FIG. 4, the main parts of the arrangement which are the same as in the preceding embodiment are designated by the same reference numbers, the drive of the selecting means being ensured by a motor 32' driving the gears 30'-31'. The contact-pieces p are as in the case of FIG. 1, connected with the contact-pieces c (constituted by pressure-controlled, temperature controlled or the like contact-pieces). The spindle 27 carries the cam 42 which controls the shifting of an arm 43 carrying a pick-up arm 44 cooperating with a record D driven by a motor M and brought during its rotation into contacting relationship with the pick-up arm 44 through a raising of its lower cam shaped edge by a ball 45.

The brush 41 feeds a relay R5 which changes over the grounding of the two leads 46 and 47. These two leads feed two contact-pieces of a switch 48 controlled by a cam 49 that rotates with the record D. The cam 49 and the switch 48 cooperate in a manner such that during one third of a revolution of the record, no contact is obtained over either of said contact-pieces, the record giving out the nature of the control during one third of a revolution corresponding to normal operation after which and during a further third of a revolution, the contact is obtained through the contact-piece connected with the lead 47 and during the last third of a revolution, the information is that of "Danger," the contact being then established over the contact-piece connected with the lead 46. The switch 48 controls through the relay R4' the short circuiting of the pick up arm 44. The lead 47 feeds, on the other hand, a relay R5b which is delayed for instance by a condenser 40 inserted in parallel. Said relay R5b feeds a relay R3' which opens through its armature 51, the circuit passing through the brush 39 while the armature 52 of the relay R3' feeds the motor M and the amplifier A and its armature 53 cuts off the connection between the wireless set 54 of the vehicle and the loud-speaker HP so as to connect with said loud-speaker the output of the amplifier A. The relay R3' is also fed through the contact-piece at CP1 which is closed when the record D revolves while in its raised position or else through the armature 55 of the relay R8.

Said relay R8 may be fed upon closing of a relay R9 provided with two windings. The biasing winding 56 is connected with the battery and the winding 57 is inserted between the positive brush of the dynamo machine and the primary of the ignition coil beyond the contact key. When the ignition circuit is broken through operation of the contact key, the current is reversed in said winding during a time sufficient for operation of the relay R9. It is possible to substitute for the winding 56 providing this biasing, a permanent magnet. The relay R8 may also be fed through operation of a push button 58 providing a reading of the speed, by the closing of a contact-piece 59 when a dangerous speed is reached, by a so-called speed limit contact-piece 60 closing when a predetermined speed is reached or by a switch 61 ensuring a continuous reading of the speed.

The relay R8 shifts through its armature 62 the feed of the amplifier A from the pick-up 44 corresponding to the control operation onto a second pick-up 63 carried by an arm 64 driven by the speedometer for cooperation with a second record D1 driven, both as to rotation and as to vertical shifting, in synchronism with the first-mentioned record D.

The operation is thus similar in principle to that of the arrangement of FIG. 1.

The detection of a defect through one of the intermediate contact-pieces p provides through the bell-shaped member 35 and the brush 40, the feeding of the motor 32' which drives the selecting and searching means, said feeding being ensured by the brush 39 after the raising of the bell-shaped member 35.

The engagement of a grounded intermediate contact-piece p by the arm 28, energizes the relay R5 which, through the lead 47, closes R5b and energizes R3'. The amplifier A is energized and the motor M starts at the same time that the searching means are stopped through a cutting off of the feed of the brush 39 while the wireless set 54 is switched off so that the amplifier A may be connected with the loud-speaker HP. Upon starting of the motor M, the record D is raised and engages the pick-up 44. During one third of a revolution, the arrangement provides a reading of the nature of the control operation, the pick-up 44 being energized. During the second third of a revolution, the switch 48 engaging the contact-piece corresponding to the lead 47 is fed by the relay R5, the relay R4' short-circuits the pick-up and no reading is performed. Lastly, during the last third of a revolution, the switch 48 engages the contact-piece corresponding to the lead 47, the pick-up is free and the apparatus provides the information "Danger."

When the defect has been removed, the armature of R5 drops, but R5b holds its contact-piece in its closed condition, by reason of the delay provided, during a time sufficient for the beginning of a further revolution of the record and this further revolution continues by reason of the energization of the relay R3' being continued by the contact at Cp1. However, during this further revolution and by reason of the change over performed by the relay R5, the information "normal" is read after information as to the nature of the control executed. At the end of the revolution the circuits are restored to their starting condition, and the motor 32' which is fed again through the brush 39 begins turning again until the bell-shaped member 35 is lowered, the revolution being at an end. When the relay R8 is energized, the relay R3' deenergizes the searching means and plays the same part that was disclosed hereinabove with the difference that the pick-up 63 is used now and provides for the reading on the record D1 of the instantaneous speed at the moment considered. If the vehicle is at a standstill, the relay R8 being fed through the relay R9 as a consequence of the switching off provided by the contact-key, the pick-up 63 reads information such as "Do not forget the parking brake."

The embodiments described hereinabove by way of example may obviously be subjected to many modifications without unduly increasing the scope of the invention as defined in the accompanying claims.

What we claim is:

1. Apparatus for controlling a series of electric contacts included in a series of electric circuits, the closing of one of said contacts corresponding each to an abnormal condition, and providing the reading aloud of an information carrying record corresponding to the abnormal condition of the controlled closed contact, said apparatus comprising, a series of contact pieces connected each with one of said electric circuits, a scanning system for said series of electric contacts and including a contact arm said contact arm being adapted to engage in succession said contact pieces, a reading electric circuit connected with said contact arm, connecting means interconnecting the said controlled circuits and disconnecting them upon closing of one of said circuits, means controlled by said connecting means to start the scanning system upon closing of one of said circuits, a record comprising a plurality of sections, each section giving out information relating to different conditions associated with the controlled electric contacts, means for reading said record, means for controlling the relative position of the reading means with reference to the record according to the position of the arm of the scanning system, and means fed by the reading electric circuit and controlling the section of the record read by the reading means according to the electric condition of the contact piece engaged by the contact arm.

2. An apparatus as claimed in claim 1 in which the connecting means interconnecting the controlled circuits and disconnecting them upon closing of one of said circuits is a relay including a winding and a plurality of armatures controlled by said winding, said armatures interconnecting the said circuits of said controlled contacts in the unfed state of the winding and a further armature in said relay controlling an electric circuit short-circuiting the electric contacts to be controlled connected with the interconnection point of the controlled circuit and which is opened in the unfed state of the winding.

3. An apparatus as claimed in claim 1 in which the means controlled by the connecting means to start the scanning system upon closing of one of the circuits comprises a relay including a winding and at least one armature, the winding of said relay being fed through the connecting means and the controlled circuits when said connecting means are in the interconnecting state and directly when said connecting means are in the disconnecting state said armature feeding the driving means of the scanning system, and means fed through said armature maintaining the connecting means in the disconnecting state when the winding of said relay is being fed.

4. An apparatus as claimed in claim 1 in which the scanning system comprises a plurality of contact-pieces connected each with one of the electric circuits of the electric contacts to be controlled, a first contact arm mounted for movement over said contact pieces in succession and a second contact arm and a continuous conductive strip provided with an insulated gap and cooperating with said second arm, an electric circuit through said second contact arm and continuous conductive strip feeding the connecting means to maintain it in the disconnecting states when the scanning system is started.

5. An apparatus as claimed in claim 1 in which the connecting means interconnecting the controlled circuits and disconnecting them upon closing of one of said circuits comprises a movable armature interconnecting the contact pieces of the electric circuits and means to separate said movable armature from said contact pieces, a further contact piece cooperating with said movable armature in its state of separation from said first series of contact pieces, an electric circuit connected to said further contact piece short-circuiting the electric contacts to be controlled, the means starting the scanning system also actuating the means to separate the movable armature from the first series of contact pieces, said apparatus also comprising driving means for the scanning system and an electric circuit feeding said driving means and closing through the movable armature when separated from the first series of contact pieces.

6. An apparatus as claimed in claim 1 in which the scanning system and connecting means comprise a disc and a series of contact pieces uniformly distributed about the periphery of the disc with an idle gap between the extreme contact pieces, each contact piece being connected with one of the circuits of the said controlled contacts, a movable contact member cooperating with said plurality of contact pieces, a spindle concentric with the disc, a contact arm carried by said spindle and adapted to cooperate in succession with said contact pieces, a driving means for said spindle and arm, a member adapted to raise the contact member away from the contact pieces except when the contact arm registers with the idle gap, a relay controlling the energization of the driving means for the contact arm and adapted to break said energization when the contact arm cooperates with an energized contact piece, a further contact piece cooperating with said movable contact member when in its raised position, an electric circuit connected with said further contact piece short-circuiting the electric contacts to be controlled, driving means for the scanning circuit, said driving means also actuating the member adapted to raise the contact member, an electric circuit feeding said driving means and closing through the movable contact member and a relay comprising a winding and an armature, said winding being fed through a circuit including the contact arm of the scanning system, said relay controlling through its armature the insertion of at least a part of the reading means.

References Cited by the Examiner
UNITED STATES PATENTS

| | | | |
|---|---|---|---|
| 2,730,703 | 1/1956 | Ross | 340—213.1 |
| 2,752,588 | 6/1956 | Marmorstone | 340—248 |
| 2,909,765 | 10/1959 | Humes | 340—221 |

BERNARD KONICK, Primary Examiner.

IRVING SRAGOW, Examiner.

M. S. GITTES, R. J. GARBACIK, Assistant Examiners.